United States Patent [19]

Affeldt et al.

[11] Patent Number: 4,741,360

[45] Date of Patent: May 3, 1988

[54] FUEL PRESSURE REGULATOR

[75] Inventors: Roger D. Affeldt, Davisburg; Kenneth L. Rische, Canton, both of Mich.

[73] Assignee: Tom McGuane Industries, Inc., Auburn Hills, Mich.

[21] Appl. No.: 95,643

[22] Filed: Sep. 14, 1987

[51] Int. Cl.⁴ .............................................. F16K 31/12
[52] U.S. Cl. ..................................... 137/510; 251/85; 251/87; 251/356
[58] Field of Search ..................... 137/510; 251/85, 87, 251/396

[56] References Cited

U.S. PATENT DOCUMENTS

| | | | |
|---|---|---|---|
| 2,062,857 | 12/1936 | Askin | 137/510 X |
| 2,311,110 | 2/1943 | Johnson | 137/510 |
| 4,231,347 | 11/1980 | Ohumi | 137/510 X |
| 4,627,463 | 12/1986 | Johnstone | 137/510 |

*Primary Examiner*—Harold W. Weakley
*Attorney, Agent, or Firm*—Barnes, Kisselle, Raisch, Choate, Whittemore & Hulbert

[57] ABSTRACT

A fuel pressure regulator comprising a housing, a diaphragm dividing the housing into a first chamber and second chamber, a passage from the exterior of the housing to the first chamber, an inlet and an outlet associated with the second chamber of the housing, and a valve seat associated with the outlet. A carrier is mounted on and movable with the diaphragm and a first spring within the first chamber yieldingly urges the carrier toward the valve seat. The carrier supports a plate that has an opening therein. A valve has a hollow tubular closed end portion that projects through the opening in the plate for engagement with the valve seat and a peripheral portion that retains the valve between the carrier and the plate. A second spring is interposed between the carrier and extends into the tubular portion of the valve to yieldingly urge the valve toward the valve seat and permit relative movement between the valve and the valve seat. The opening of the plate is larger than the tubular portion of the valve and the valve is movable transversely to provide for proper centering of the valve in the valve seat.

4 Claims, 2 Drawing Sheets

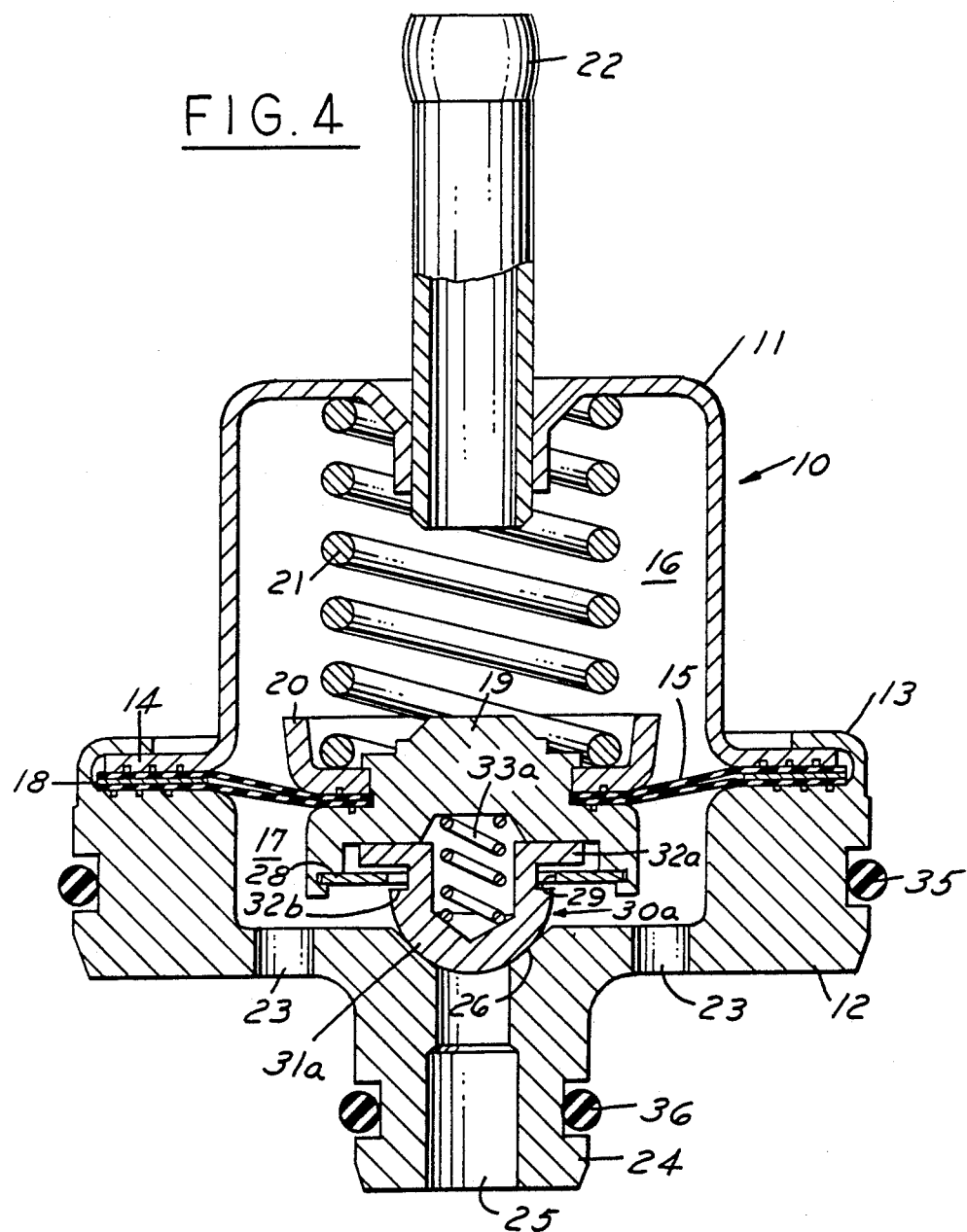

4,741,360

FUEL PRESSURE REGULATOR

This invention relates to fuel pressure regulators.

BACKGROUND AND SUMMARY OF THE INVENTION

In fuel injection systems of the port injection or throttle body type, it is common to provide fuel pressure regulators which function by having a fuel pump to supply fuel to the regulator at an inlet to cause a diaphragm assembly to move away from a valve seat to control the fuel flow through the outlet of the regulator and to the tank. Pressure is maintained at the desired pressure differential between the pump and the outlet of the regulator. The fuel pump displaces a fixed flow rate so the amount of fuel returned to the tank varies with engine speed, the largest return rate occurring at idle. When the fuel pump is stopped the regulator starts to close then acts as a shut off valve to maintain pressure on the system.

In one common type of regulator as shown in U.S. Pat. No. 3,511,270, the valve comprises a small ball attached to a plate which allows for angular misalignments of the diaphragm assembly to the valve seat. In that arrangement, accurate complementary flat surfaces must be provided on both the ball and the plate. A valve in the form of a hollow tubular closed end portion that projects through the opening in the plate for engagement with the valve seat and a peripheral portion that retains the valve between the carrier and the plate. A second spring is interposed between the carrier and extends into the tubular portion of the valve to yieldingly urge the valve toward the valve seat and permit relative movement between the valve and the valve seat. In U.S. Pat. No. 4,237,924, a spherical ball having a flat portion is seated in a socket member which is yieldingly urged by a diaphram to bring the flat portion against an annular valve seat. Accurate flat surfaces are also required in such an arrangement.

In U.S. Pat. No. 4,627,463, issued Dec. 9, 1986, there is disclosed a fuel pressure regulator comprising a housing, a diaphragm dividing the housing into a first chamber and second chamber, a passage from the exterior of the housing to the first chamber, an inlet and an outlet associated with the second chamber of the housing, and a valve seat associated with the outlet. A cage is mounted on and movable with the diaphragm and a spring within the first chamber yieldingly urges the cage toward the valve seat. The cage supports a pair of plates which retain a valve ball. The first plate has an opening through which a portion of the ball projects and a second plate retains the first plate and ball within the cage. The first plate is movable laterally to provide for proper centering of the ball in the valve seat. A light spring extends between the cage and the ball to urge the ball against the first plate.

Among the objectives of the present invention are to provide a fuel pressure regulator of the type shown in the aforementioned U.S. Pat. No. 4,627,463, which is more compact, easier to assemble and less costly to manufacture.

In accordance with the invention, the fuel pressure regulator comprises a housing, a diaphragm dividing the housing into a first chamber and second chamber, a passage from the exterior of the housing to the first chamber, an inlet and an outlet associated with the second chamber of the housing, and a valve seat associated with the outlet. A carrier is mounted on and movable with the diaphragm and a first spring within the first chamber yieldingly urges the carrier toward the valve seat. The carrier supports a plate that has an opening therein. A valve has a hollow tubular closed end portion that projects through the opening in the plate for engagement with the valve seat and a peripheral portion that retains the valve between the carrier and the plate. A second spring is interposed between the carrier and extends into the tubular portion of the valve to yieldingly urge the valve toward the valve seat and permit relative movement between the valve and the valve seat. The opening of the plate is larger than the tubular portion of the valve and the valve is movable transversely to provide for proper centering of the valve in the valve seat.

DESCRIPTION OF THE DRAWINGS

FIG. 4 is a sectional view on an enlarged scale of a modified form of fuel pressure regulator.

DESCRIPTION

Figure 1:
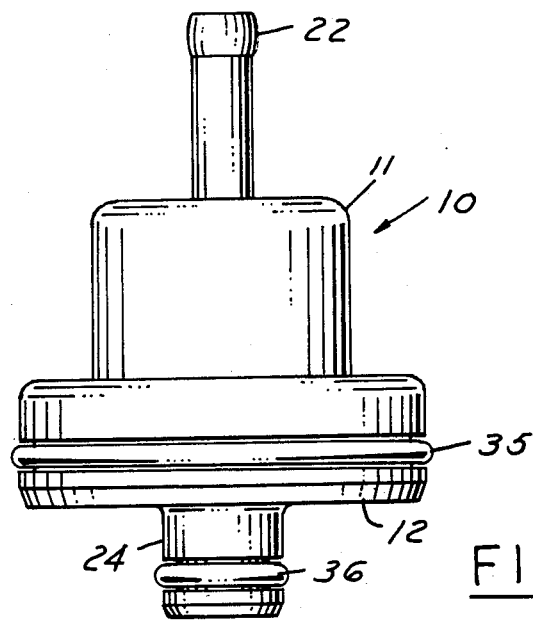
FIG. 1 is an elevational view through a fuel pressure regulator embodying the invention.
Figure 2:
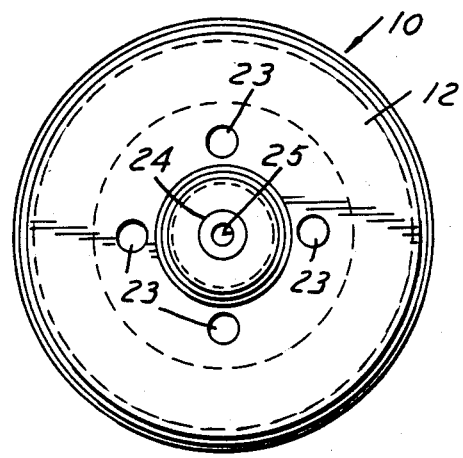
FIG. 2 is a bottom plan view of the fuel pressure regulator on an enlarged scale taken along the line 2—2 in FIG. 1.
Figure 3:
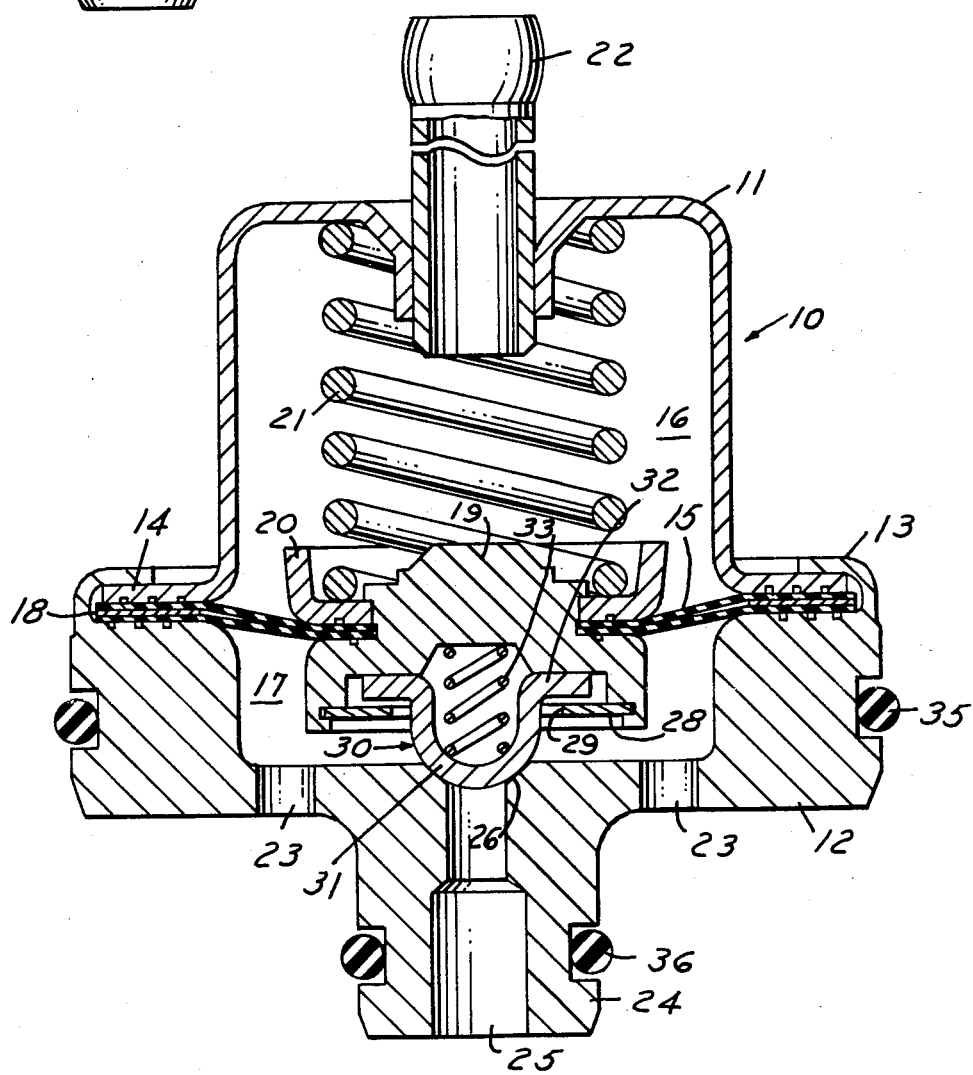
FIG. 3 is a sectional view on an enlarged scale of a portion of the fuel pressure regulator shown in FIG. 1.

Referring to FIG. 1, the fuel pressure regulator embodying the invention comprises a housing 10 consisting of two halves 11, 12 that are clamped together by folding flange 13 over flange 14. A diaphragm 15 is provided between the housing halves 11, 12 and may be made of two layers of elastic material such as fabric reinforced fluoro-silicone. The diaphragm 15 divides the housing into a first chamber 16 and a second chamber 17. A clamping fiberboard spacer 18 is interposed between the flanges 13, 14 and diaphragm 15. The diaphragm 15 supports a carrier 19 and the carrier 19 is held in position by a spring retainer 20 that is connected to the carrier 19 by staking. A compression spring 21 urges the retainer 20 and cage 19 downwardly as shown in FIG. 3. The chamber 16 includes a passage or vacuum fitting 22. Housing half 12 includes a plurality of inlet openings 23 to the chamber 17 and includes an integral projection 24 having an axial passage 25 extending upwardly adjacent the diaphragm and defining a frustoconical seat 26.

The carrier 19 supports a plate 28 that has an opening 29 therein. A valve 30 has a hollow tubular closed end portion 31 that projects through the opening 29 in the plate 28 for engagement with the valve seat 27. Valve 30 includes a planar peripheral portion 32 which extends radially outwardly from said tubular portion 31 and retains the valve 30 between the carrier 19 and the plate 28. A second light spring 33 is interposed between the carrier 19 and extends into the tubular portion 31 of the valve 30 to yieldingly urge the valve portion 31 toward the valve seat 27 while permitting relative movement between the valve 30 and the valve seat 27. The diameter of the opening 29 is greater than the outer diameter of the tubular portion 31 of valve 30 so that the valve 30 can move laterally permitting movement of the valve to accommodate any misalignment between the tubular portion 31 and valve seat 27.

Annular seals 35, 36 are associated with the housing half 12. Seal 35 isolates the inlet openings 23 from the atmosphere and seal 36 isolates the inlet openings 23 from the outlet opening 25.

In operation, when the ignition is turned on, fuel is introduced by the fuel pump to inlets 23 and forces the diaphragm upwardly permitting fuel to flow through the passage 25 out of the regulator through outlet opening 25 to the fuel tank. As manifold vacuum of the engine changes, the vacuum applied to vacuum passage 22 causes the diaphragm to move the valve 31 away from or closer to the seat 26 and the amount of fluid passing through the outlet is changed, maintaining a constant pressure differential across the injectors.

In the modified form shown in FIG. 4, provision is made for greater flow by having an annular seat 26a of greater diameter. A valve 30a has a flange 32a which engages plate 28 to retain valve 30a. Valve 30a includes a groove 32b in the plane of plate 28 to permit relative lateral movement of valve 30a such that a portion of the plate extends into the groove 32b.

It can thus be seen that the present invention provides a fuel pressure regulator of the type shown in the aforementioned U.S. Pat. No. 4,627,463 which is more compact, easier to assemble and less costly to manufacture.

What is claimed is:

1. A fuel pressure regulator comprising a housing,
a diaphragm dividing the housing into a first chamber and second chamber,
a passage from the exterior of the housing to said first chamber,
an inlet and an outlet associated with the second chamber of the housing,
a valve seat associated with the outlet,
a carrier mounted on and movable with the diaphragm,
a spring within the first chamber yieldingly urging the carrier toward the valve seat,
said carrier supporting a plate that has an opening therein,
a valve having a hollow tubular closed end portion that projects through said opening in the plate for engagement with said valve seat,
said valve having a peripheral portion that retains said valve between said carrier and said plate,
a second spring interposed between said carrier and extending into the tubular portion of the valve to yieldingly urge said closed end tubular portion of said valve toward the valve seat and permit relative movement between said valve and said valve seat.

2. The fuel pressure regulator set forth in claim 1 wherein said valve includes a planar peripheral portion which extends radially outwardly from said tubular portion.

3. The fuel pressure regulator set forth in claim 1 wherein the opening in said plate has a greater diameter than said tubular portion of the valve to permit transverse movement of said valve relative to said valve seat.

4. The fuel pressure regulator set forth in claim 3 wherein said valve includes a groove in the plane of said plate such that the valve may move so that a portion of the plate extends into said groove.

* * * * *